(12) United States Patent
Lange

(10) Patent No.: US 10,746,310 B2
(45) Date of Patent: Aug. 18, 2020

(54) CHANGEOVER VALVE

(71) Applicant: Fluehs Drehtechnik GmbH, Luedenscheid (DE)

(72) Inventor: Lutz Lange, Luedenscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 192 days.

(21) Appl. No.: 16/067,834

(22) PCT Filed: Mar. 6, 2017

(86) PCT No.: PCT/EP2017/055172
§ 371 (c)(1),
(2) Date: Jul. 3, 2018

(87) PCT Pub. No.: WO2017/153327
PCT Pub. Date: Sep. 14, 2017

(65) Prior Publication Data
US 2019/0017611 A1     Jan. 17, 2019

(30) Foreign Application Priority Data
Mar. 8, 2016  (DE) .................... 20 2016 101 244 U

(51) Int. Cl.
*F16K 11/074*     (2006.01)
*F16K 11/02*      (2006.01)
(Continued)

(52) U.S. Cl.
CPC ........ *F16K 11/0743* (2013.01); *F16K 11/025* (2013.01); *F16K 11/0787* (2013.01); *F16K 11/165* (2013.01)

(58) Field of Classification Search
CPC .... F16K 27/04; F16K 11/072; F16K 11/0743; F16K 11/025; F16K 11/0787; F16K 11/165; E03C 1/04
(Continued)

(56) References Cited

U.S. PATENT DOCUMENTS 2,620,813 A * 12/1952 Bloomfield ....... F16K 31/52408
                                                        137/38
6,805,151 B1 * 10/2004 Chang .................. F16K 11/0743
                                                        137/270
(Continued)

FOREIGN PATENT DOCUMENTS

DE        202014101116 U1 *  4/2014  ........... F16K 27/045

OTHER PUBLICATIONS

Machine Translation of DE202014101116 retrieved from espacenet.com on Mar. 2020. (Year: 2020).*

(Continued)

*Primary Examiner* — Jessica Cahill
(74) *Attorney, Agent, or Firm* — Collard & Roe, P.C.

(57) ABSTRACT

A changeover valve includes a wall connection housing with at least one inlet channel and at least three outlet channels opening into a valve seat for receiving a valve upper part. The valve upper part has a base piece with at least three outlet openings connectable to a respective outlet channel via the valve seat. The valve upper part has at least one feed connected to the at least one inlet channel and connectable to at least one outlet opening via a control disc rotatable relative to a stationary inlet disc. The control disc engages with a spindle for rotating the control disc. The base piece has at least one positioning pin engaging into a positioning bore arranged in the valve seat. The valve seat has at least (Continued)

Figure 1:
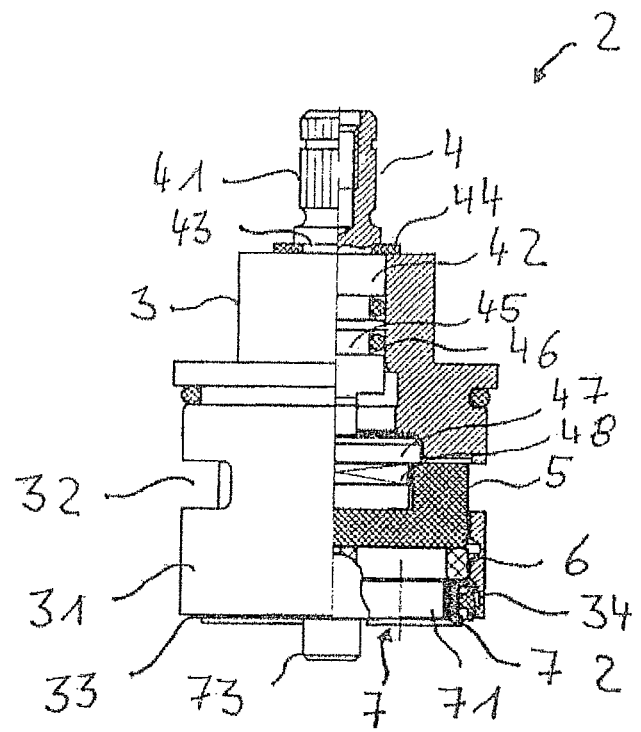

two positioning bores for engaging with the at least one positioning pin in different assembly positions of the valve upper part.

6 Claims, 5 Drawing Sheets

(51) Int. Cl.
  *F16K 11/078* (2006.01)
  *F16K 11/16* (2006.01)
(58) Field of Classification Search
  USPC .......................................................... 137/597
  See application file for complete search history.

(56) References Cited

U.S. PATENT DOCUMENTS

| | | | | |
|---|---|---|---|---|
| 2005/0116065 | A1* | 6/2005 | Yang ..................... | E03C 1/0408 239/443 |
| 2008/0190501 | A1* | 8/2008 | Yang .................. | F16K 11/0743 137/625.47 |
| 2011/0284101 | A1* | 11/2011 | Thurau ................. | F16K 11/074 137/468 |
| 2013/0048123 | A1* | 2/2013 | Chen ....................... | F16K 35/04 137/625.15 |
| 2013/0056664 | A1* | 3/2013 | Huang ................ | F16K 11/0787 251/231 |
| 2013/0334324 | A1* | 12/2013 | Ruga ..................... | F16K 11/074 236/12.13 |
| 2015/0055433 | A1* | 2/2015 | Lange ................. | F16K 11/0787 366/132 |
| 2015/0144214 | A1* | 5/2015 | Chang .................... | F16K 11/02 137/625.41 |
| 2016/0084403 | A1* | 3/2016 | Kemp ...................... | F16K 3/08 251/279 |
| 2016/0326731 | A1* | 11/2016 | Lange ................. | F16K 11/0787 |
| 2018/0224006 | A1* | 8/2018 | Killip .................... | G01N 30/20 |

OTHER PUBLICATIONS

International Search Report of PCT/EP2017/055172, dated May 12, 2017.

* cited by examiner a)  b)

CHANGEOVER VALVE

CROSS REFERENCE TO RELATED APPLICATIONS

This application is the National Stage of PCT/EP2017/055172 filed on Mar. 6, 2017, which claims priority under 35 U.S.C. § 119 of German Application No. 20 2016 101 244.9 filed on Mar. 8, 2016, the disclosure of which is incorporated by reference. The international application under PCT article 21(2) was not published in English.

The invention relates to a change-over valve, comprising a wall connection housing having at least one inlet channel and at least three outlet channels, which open into a valve seat for accommodation of a valve top, which valve top has a base piece having at least three outlet openings, which can be connected with one of the at least three outlet channels, in each instance, by way of the valve seat, and furthermore has a feed that is connected with the at least one inlet channel and can be connected with at least one of the at least three outlet openings by way of a control disk that can be rotated by way of a spindle with which it is in engagement, relative to a stationary inlet disk, wherein the base piece has at least one positioning pin that engages into at least one position bore disposed in the valve seat.

Change-over valves are known in the most varied configurations. They serve for optional allocation of fluid streams, for example of a water stream to a shower head or to a bathtub feed. Increasingly, change-over valves are also being used that allow allocation of a fluid stream to three different output locations, for example allocation of a water stream to a bathtub outlet, a rain-head shower, and a hand-held shower head. Such change-over valves are mounted in a wall, in many cases. In this regard, installation takes place in two steps. First, a wall connection housing is plastered in place in a wall and connected with the required feed and drain lines. Subsequently, the wall is normally tiled or provided with a decorative finish or the like. Finally, installation of the fittings and also of a valve top into the wall connection housing that is already situated in the wall is carried out—often by a different installer. In this regard, it can happen that either because of incorrect installation of the wall connection housing, or also due to a change in plans by the owner, incorrect allocation of the spindle position of the valve top, i.e. of the operating lever connected with the spindle exists after installation of the valve top into the wall connection housing. To change the allocation, removal and renewed installation of the wall connection housing is required in such a case.

This is where the invention wishes to provide a remedy. The invention is based on the task of making available a change-over valve that allows a change in the allocation of spindle positions of the valve top to the individual fluid streams, without removal of the wall connection housing. According to the invention, this task is accomplished by the characteristics of the characterizing part of claim 1.

With the invention, a change-over valve is made available, which allows a change in the allocation of the spindle setting of the valve top to the individual fluid output locations, without removal of the wall connection housing. Because of the fact that at least two position bores are present in the valve seat for engagement of the at least one positioning pin in different installation positions of the valve top, a change in the allocation of the individual fluid output locations to the spindle positions of the valve top is made possible by means of a change in the installation position of the valve top in the wall connection housing.

The term "positioning bore" is not restricted to round cross-sections in the present case. Instead, this term subsumes all depressions or recesses that are suitable and intended for accommodating a positioning pin that corresponds with this depression or recess for defined positioning of the change-over valve. The term "positioning pin" is also not restricted to round cross-sections. It subsumes all projections that are suitable and intended for being accommodated by a corresponding depression or recess for defined positioning of the change-over valve. Thus, for example, positioning bore and positioning pin can also have a polygonal or ellipsoid cross-section.

In a further development of the invention, three position bores are disposed in the valve seat, wherein the three outlets of the valve seat that correspond with the outlet openings of the base piece of the valve top are disposed offset from one another by 120°, in each instance. As a result, flexible re-allocation of the outlet channels of the wall connection housing to the outlet openings of the base piece of the valve top is made possible. For this purpose, the valve top is simply set into one of the three positioning bores, which are disposed offset relative to one another, with its positioning pin.

In an embodiment of the invention, the control disk and the inlet disk are configured in such a manner that the feed is connected with two of the three outlet openings in at least one rotational position of the control disk relative to the inlet disk. As a result, simultaneous allocation of the fluid stream to two outlet channels of the wall connection housing is made possible, as is desired, for example, in the case of simultaneous water supply to a rain-head shower and a side shower.

In a further embodiment of the invention, the inlet disk has at least one, preferably three passage bores that are configured to widen in funnel shape in the direction of the control disk. As a result, flexible allocation of the feed stream to one or also two outlet channels is made possible by way of a corresponding position of the control disk.

In a further development of the invention, the feed is formed by at least one window disposed laterally in the valve top. As a result, the design configuration of valve top and valve seat is simplified.

In a further embodiment of the invention, the control disk has precisely one passage opening, wherein the passage opening has an essentially trilobular shape. As a result, flexible allocation of the feed water stream to one or two outlet channels of the wall connection housing is made possible.

Figure 2:
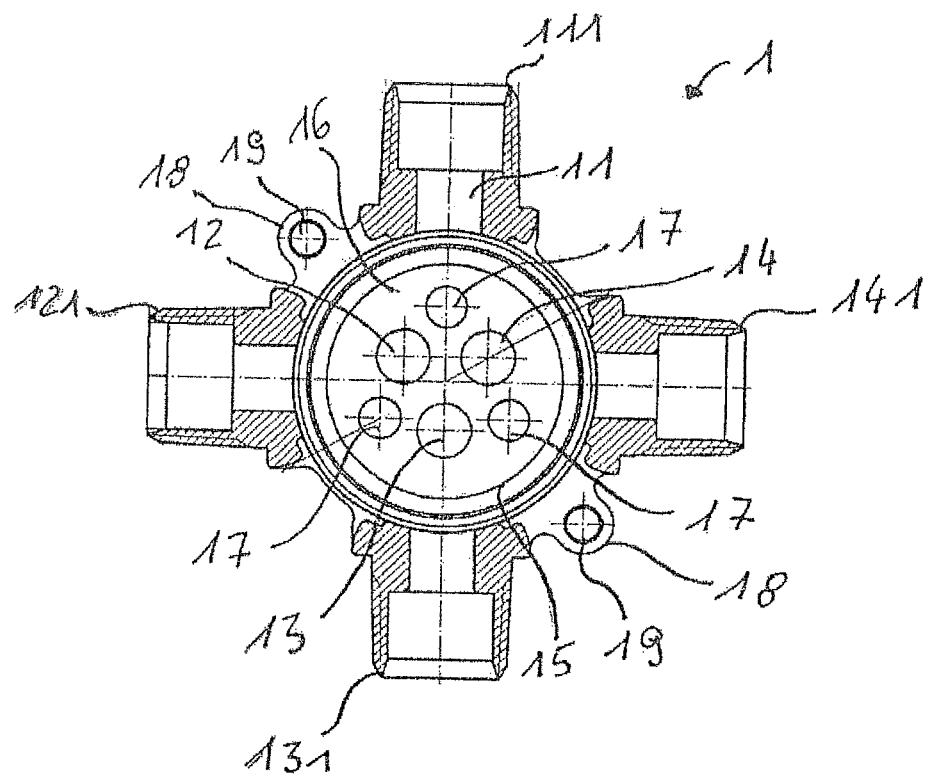
Figure 3:
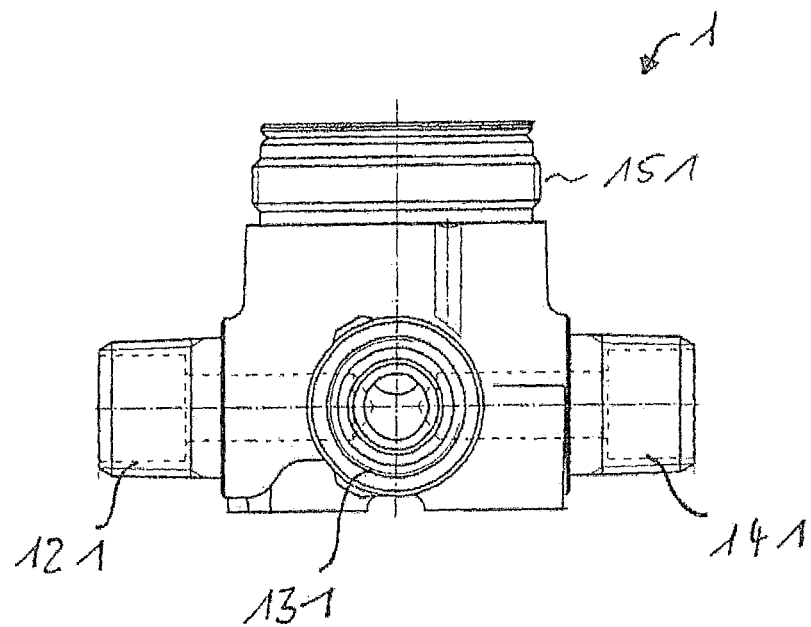
Figure 4:
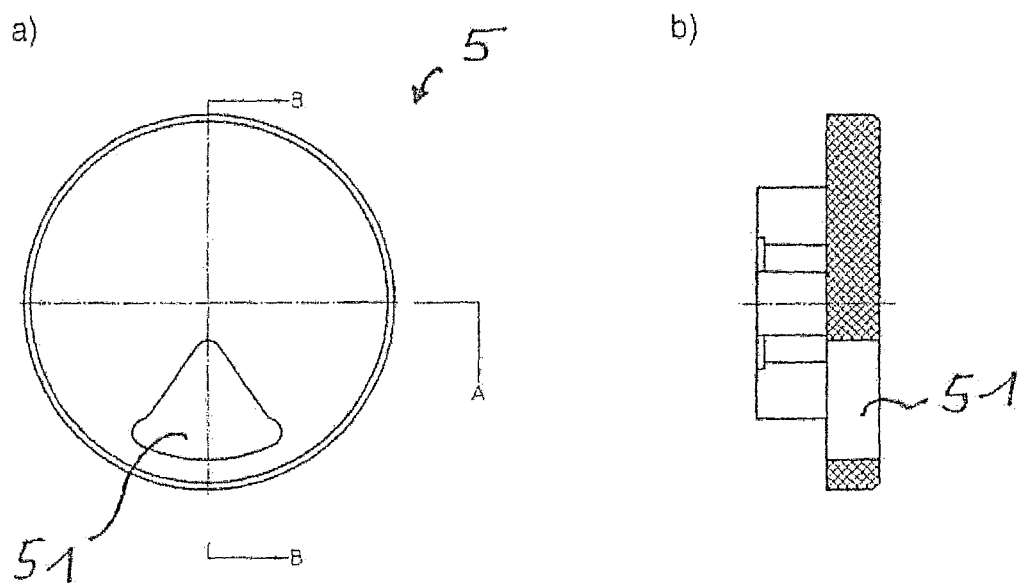
Figure 4:
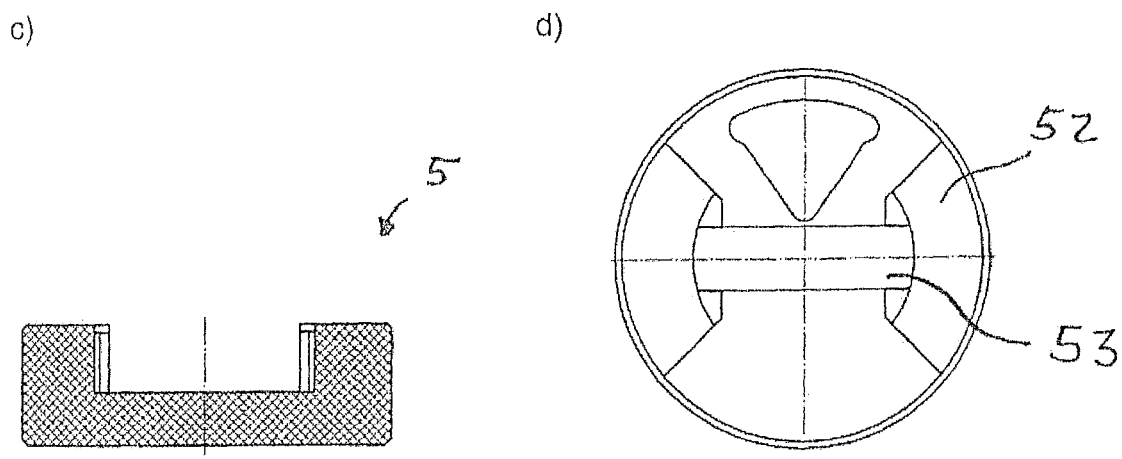
Figure 5:
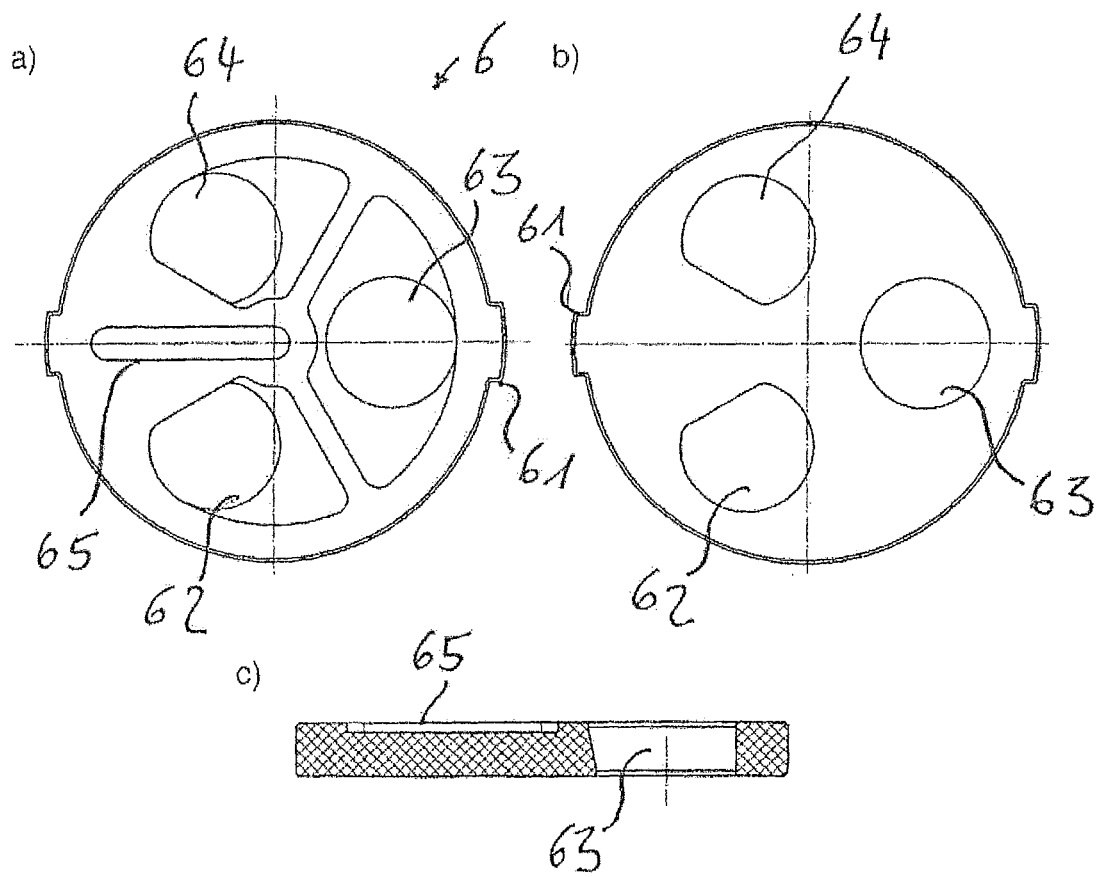
Figure 6:
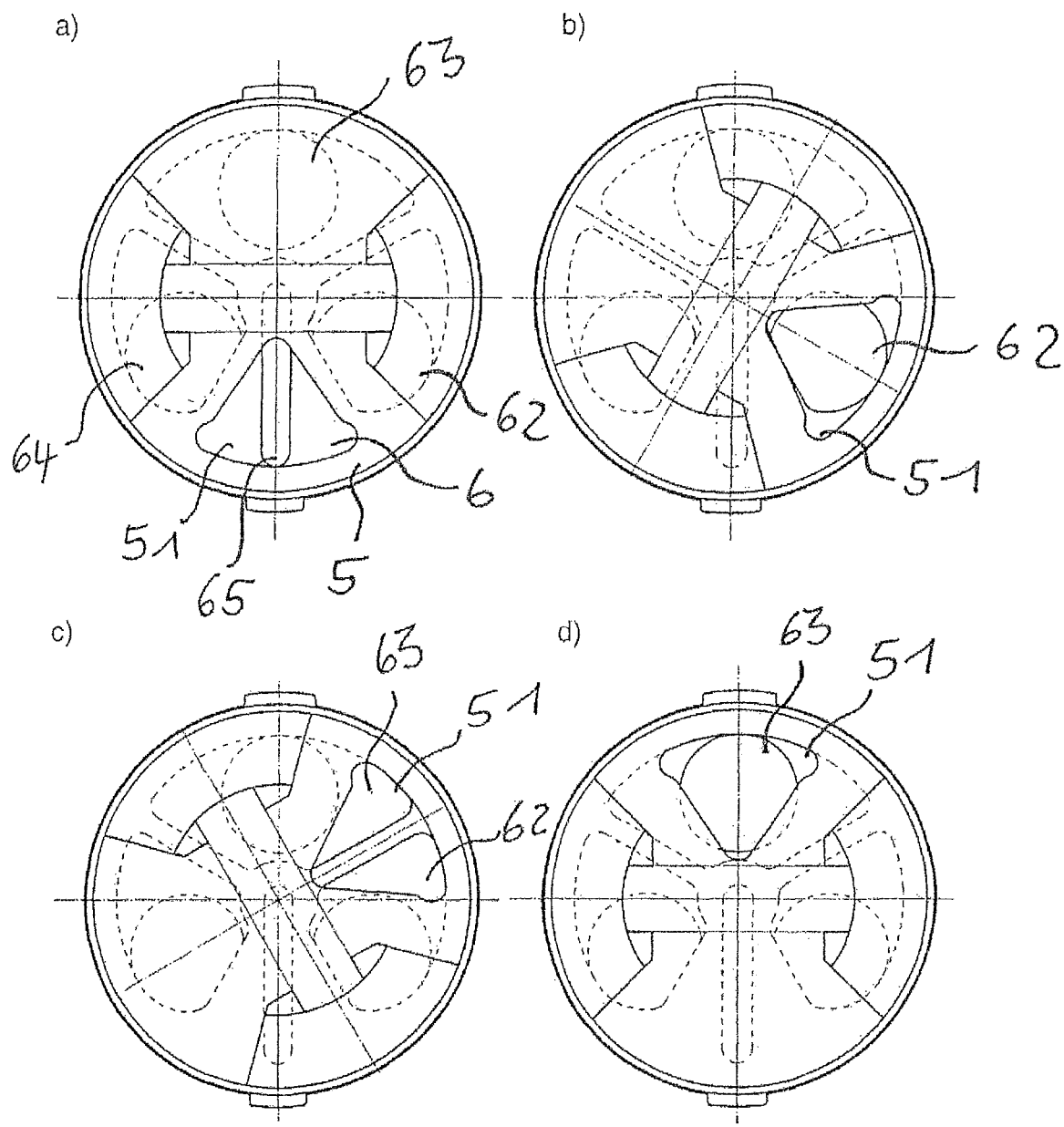
Figure 6:
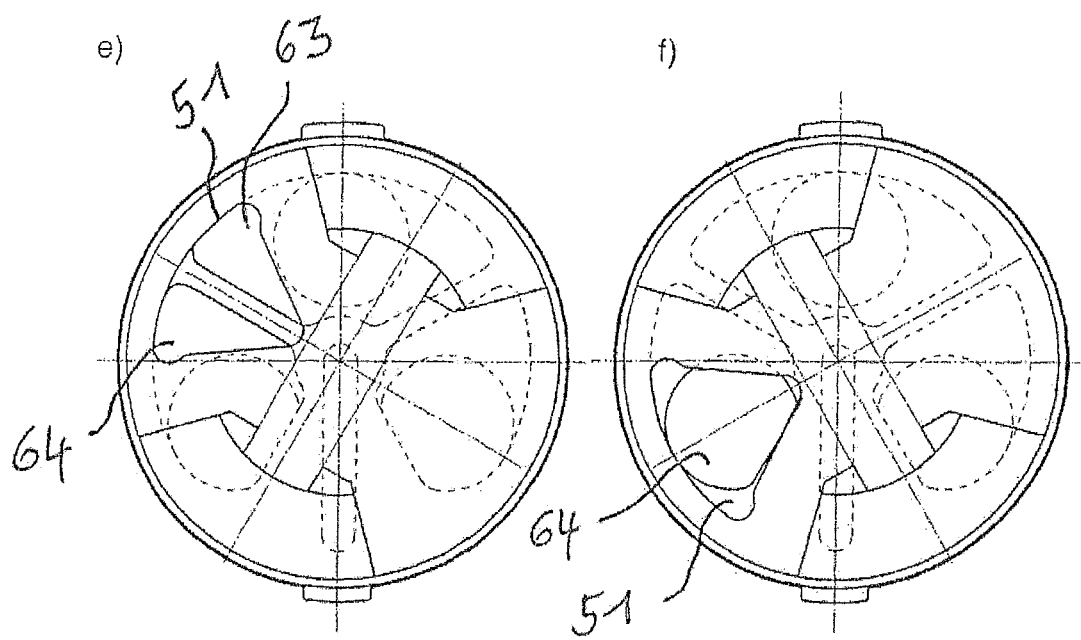

Other further developments and embodiments of the invention are indicated in the remaining dependent claims. An exemplary embodiment is shown in the drawings and will be described in detail below. The figures show:

FIG. 1 the schematic representation of a valve top of a change-over valve;

FIG. 2 the schematic representation of a wall connection housing of a change-over valve;

FIG. 3 the representation of the wall connection housing from FIG. 2 in a side view;

FIG. 4 the schematic representation of the control disk of the valve top from FIG. 1
  a) in a view from below;
  b) in a sectional representation B-B;
  c) in a sectional representation A;
  d) in a top view;

FIG. 5 the schematic representation of the inlet disk of the valve top from FIG. 1
  a) in a top view;

b) in a view from below;
c) in longitudinal section;

FIG. 6 the schematic representation of the overlaps of control disk and outlet disk of the valve top from FIG. 1 in the positions
 a) valve closed;
 b) first passage bore of the inlet disk open;
 c) first and second passage bore of the inlet disk open;
 d) second passage bore of the inlet disk open;
 e) second and third passage bore of the inlet disk open;
 f) third passage bore of the inlet disk open.

The change-over valve selected as an exemplary embodiment consists essentially of a wall connection housing 1, which accommodates a valve top 2.

In the exemplary embodiment, the wall connection housing 1 is produced from brass and comprises a valve space 15 configured in cup shape, in which a valve seat 16 is introduced on the bottom side. Three outlet channels 12, 13, 14, which are connected, in each instance, with an outlet connector 121, 131, 141 formed on the valve space 15 on the outside, and are offset relative to one another by 120°, in each instance, open into the valve seat 16. Furthermore, an inlet connector 111 is formed on the valve space 15 on the outside and connected with an inlet channel 11, which opens into the valve space 15 at the side. The inlet connector 111 as well as the three outlet connectors 121, 131, 141 are formed on the valve space 15 offset relative to one another by 90°, in each instance, and serve for connecting fluid feed and drain lines. Furthermore, three positioning bores 17 are introduced into the valves seat 16 and offset by 120° relative to one another, which bores are configured in the form of a dead-end bore, in each instance. The positioning bores 17 serve for alternative accommodation of the positioning pin 73 of the base piece 7 of the valve top 2. Furthermore, two attachment tabs 18 are disposed between two inlet or outlet connectors 111, 121, 131, 141, in each instance, which tabs are each provided with a bore 19. The attachment tabs 18 serve for fixing the wall connection housing 1 in place in the installation space of a wall. The connection housing 1 is provided with an outside thread 151 for connection of a fitting for operation of the valve top 2.

The valve top 2 selected as an exemplary embodiment has a head piece 3, through the center of which a spindle 4, guided radially in it, passes. A control disk 5 is connected with the spindle 4 with shape fit, and radially guided in the head piece 3. An inlet disk 6 is provided in the head piece 3 on its side of the control disk 5 facing away from the spindle, the inlet disk being followed by a base piece 7 that makes contact with the valve seat 16 of the valve space 15 of the wall connection housing 1.

The head piece 3 consists of a symmetrical hollow body, the two face sides of which are open. On its side facing the valve seat 16, the head piece 3 has a sleeve-like part 31, in which two passage windows 32 are provided. After introduction into the valve space 15, a collar 33 of the head piece 3 lies on the valve seat 16 of the valve space 15. An undercut 34 is disposed in the sleeve-like part 31 on the inside, in the region of the collar 33.

The spindle 4 is essentially structured to be solid. On its face side that faces away from the head piece 3, it is structured as an outer polygon 41 on the outside. Subsequently, a cylinder surface 42 is provided on the spindle 4, on the outside, with which surface the spindle 4 is radially guided in the head piece 3. An insertion 43 is provided between the cylinder surface 42 and the outer polygon 41, in which insertion a shaft lock 44 in the form of a split ring is resiliently laid. The shaft lock 44 prevents penetration of the spindle 4 into the head piece 3 beyond the dimension provided. Furthermore, two ring grooves 45 are introduced into the cylinder surface 42, which grooves accommodate O-rings 46. On the side of the spindle 4 that lies opposite the outer polygon 41, a disk 47 is formed on, which has a driver 48 on its side facing the collar 33.

The control disk 5 is essentially configured as a circular disk, into which a trilobular passage opening 51 is introduced. On its side facing the spindle 32, the control disk 5 has two arc-shaped steps 52 that are disposed diametrically opposite one another. The arc-shaped ring-shaped steps 52 surround the driver 48 of the spindle 4 in the assembled state. Recesses 53 are formed on the steps 52, into which recesses the driver 48 engages (cf. FIG. 4d)).

The inlet disk 6 is shown in FIG. 5. It has two projections 61 that lie diametrically opposite one another on its circumference. With the projections 61, the inlet disk 6 engages into recesses that are provided on the sleeve-shaped part 31 of the head piece 3 for this purpose. Thereby the inlet disk 6 is disposed in the head piece 3 in torque-proof manner. The inlet disk 6 has three passage bores 62, 63, 64 that are disposed offset by 120° relative to one another, and are each configured to widen in funnel shape in the direction of the control disk 5. An elongated depression 65 is disposed between two passage bores 62, 63 on the center line that runs between the projections 61, which depression extends all the way to the center point of the inlet disk. The elongated depression 65 serves for flushing out material worn off by friction, which forms centrally between control disk 5 and inlet disk 6.

In the exemplary embodiment, the base piece 7 is produced from plastic and also has two projections that lie diametrically opposite one another on its circumference, with which projections it engages into recesses that are provided for this purpose in the sleeve-shaped part 31 of the head piece 3. It is thereby disposed in the head piece 3 in torque-proof manner. The base piece 7 has three outlet openings 71, disposed offset by 120° relative to one another, which openings can be positioned to overlap with the three passage bores 62, 63, 64 of the inlet disk 6, and in which a lip seal 72 is disposed, in each instance, for providing a seal relative to the outlet channels 12, 13, 14 of the valve seat 16 of the valve space 15. Furthermore, the base piece 7 has a cylindrical positioning pin 73 on its underside, facing away from the inlet disk 6, which pin corresponds with the positioning bores 17 of the valve seat 16 and serves for positioning of the valve top 2 in the valve space 15 of the wall connection housing 1.

In the exemplary embodiment, the valve top 2 is positioned on the valve seat 16 of the valve space 15 of the wall connection housing 1 in such a manner that the first passage bore 62 of the inlet disk 6 is connected with the first outlet channel 12 of the wall connection housing 1 by way of an outlet opening 71 of the base piece 7. The second passage bore 63 as well as the third passage bore 64 of the inlet disk 6 are connected with the second outlet channel 13 and the third outlet channel 14 of the wall connection housing 1, respectively, in this position, by way of outlet openings 71 of the base piece 7. Furthermore, the valve top 2 is connected with the inlet channel 11 of the wall connection housing 1, which channel ends in the valve space 15, by way of the passage windows 32 that are disposed in the head piece 3.

In FIG. 6, different positions of the valve top 2 of the change-over valve are shown as a function of the rotational position of the control disk 5 relative to the inlet disk 6, which position is adjustable by way of the spindle 4:

In the rotational position according to FIG. 6a), the passage opening 51 of the control disk 5 is situated above the depression 65 of the inlet disk 6. All the passage bores 62, 63, 64 of the inlet disk 6 are closed by means of the control disk 5. The valve top 2 is therefore in the "closed" position.

In the position according to FIG. 6b), the passage opening 51 of the control disk 5 overlaps the first passage bore 62 of the inlet disk 6. In this position, the inlet channel 11 of the wall connection housing 1 is connected with the first outlet channel 12 by way of the passage windows 32 of the head piece 3. The valve top is in the "water feed by way of the first outlet connector" position.

In the position according to FIG. 6c), the passage opening 51 of the control disk 5 overlaps both the first passage bore 62 and the second passage bore 63 of the inlet disk 6. In this position, the inlet channel 11 is connected both with the first outlet channel 12 and with the second outlet channel 13. The valve top 2 is therefore situated in the "water feed by way of the first and the second outlet connector" position.

In the position according to FIG. 6d), the passage opening 51 of the control disk 5 overlaps with the second passage bore 63 of the inlet disk 6. In this position, the inlet channel 11 is connected with the second outlet channel 13. The valve top 2 is therefore situated in the "water feed by means of the second outlet connector" position.

In the position according to FIG. 6e), the passage opening 51 of the control disk 5 overlaps both the second passage bore 63 and the third passage bore 64 of the inlet disk 6. In this position, the inlet channel 11 is connected both with the second outlet channel 13 and with the third outlet channel 14. The valve top 2 is consequently situated in the "water feed by means of the second and third outlet connector" position.

In the position according to FIG. 6f), the passage opening 51 of the control disk 5 overlaps the third passage bore 64 of the inlet disk 6. In this position, the inlet channel 11 is connected with the third outlet channel 14 of the wall connection housing 1. The valve top 2 is consequently situated in the "water feed by way of the third outlet connector" position.

The three positioning bores 17, which are disposed in the valve seat 16 offset from one another by 120°, allow three alternative configurations of the valve top 2 on the valve seat 16 of the valve space 15 of the wall connection housing 1, positioned rotated by 120°, in each instance, and thereby the allocations of the individual outlet channels 12, 13, 14 to the passage bores 62, 63, 64 of the inlet disk 6 of the valve top 2 are adjustable. For example, proceeding from the exemplary embodiment according to FIG. 6, allocation of the first passage bore 62 of the inlet disk 6 to the second outlet channel 13, allocation of the second passage bore 63 of the inlet disk 6 to the third outlet channel 14, as well as allocation of the third passage bore 64 of the inlet disk 6 to the first outlet channel 12 of the wall connection housing 6 is achieved by means of positioning of the valve top 2 in the valve seat 16, rotated by 120°. A simple change in the allocation of the passage bores 62, 63, 64 of the inlet disk 6 to the discharge channels 12, 13, 14 of the wall connection housing 1 is thereby made possible by means of rotational positioning of the valve top 2 in the valve seat 16 of the valve space 15 of the wall connection housing 1.

The invention claimed is:

1. A change-over valve, comprising a wall connection housing having at least one inlet channel and at least three outlet channels, which open into a valve seat for accommodation of a valve top, which valve top has a base piece having at least three outlet openings, each outlet opening of the at least three outlet openings being connected with a respective one of the at least three outlet channels by way of the valve seat, and furthermore has at least one window disposed laterally in the valve top and which is connected with the at least one inlet channel and can be connected with at least one of the at least three outlet openings by way of a control disk that can be rotated by way of a spindle with which the control disk is in engagement, relative to a stationary inlet disk, wherein the base piece has at least one positioning pin that engages into at least one positioning bore disposed in the valve seat, wherein at least two positioning bores are present in the valve seat for engagement of the at least one positioning pin in different installation positions of the valve top.

2. The change-over valve according to claim 1, wherein three positioning bores are disposed in the valve seat, wherein the three outlet channels of the valve seat that correspond respectively with the outlet openings of the base piece of the valve top are disposed offset from one another by 120 degrees.

3. The change-over valve according to claim 1, wherein the control disk and the inlet disk are configured in such a manner that the at least one window is connected with two of the three outlet openings in at least one rotational position of the control disk relative to the inlet disk.

4. The change-over valve according to claim 1, wherein the inlet disk has at least one, passage bore configured to widen in funnel shape in the direction of the control disk.

5. The change-over valve according to claim 1, wherein the control disk has precisely one passage opening, wherein the passage opening has an essentially trilobular shape.

6. The change-over valve according to claim 1, wherein the inlet disk has three passage bores configured to widen in funnel shape in the direction of the control disk.

* * * * *

UNITED STATES PATENT AND TRADEMARK OFFICE
CERTIFICATE OF CORRECTION

PATENT NO. : 10,746,310 B2
APPLICATION NO. : 16/067834
DATED : August 18, 2020
INVENTOR(S) : Lange Page 1 of 1

It is certified that error appears in the above-identified patent and that said Letters Patent is hereby corrected as shown below:

In the Claims

In Claim 4, Line 2 (Column 6, Line 43), after "one" please delete ",".

Signed and Sealed this
Twenty-second Day of September, 2020

Andrei Iancu
*Director of the United States Patent and Trademark Office*